Patented June 19, 1945

2,378,698

UNITED STATES PATENT OFFICE 2,378,698

PARTIAL ETHERS OF ALKENYL SUBSTITUTED POLYHYDROXYBENZENES

Carlin F. Gibbs, Cuyahoga Falls, Ohio, assignor to The B. F. Goodrich Company, New York, N. Y., a corporation of New York No Drawing. Application May 1, 1943.
Serial No. 485,364

1 Claim. (Cl. 260—613)

This invention relates to a new composition of matter and pertains more specifically to the class of compounds consisting of the o-alkenyl derivatives of hydroquinone mono alkyl or mono aralkyl ethers.

These new compounds are useful as antioxidants or age resisters, especially in rubber compositions. They have particular value in that they do not stain light colored rubber compounds and in that they are extremely effective in preventing flex cracking of rubber compositions. Any of the natural rubbers, such as caoutchouc, balata, gutta percha, latex, as well as artificial rubber isomers, and synthetic rubbers such as the polymers of butadiene, chloroprene or the like, or copolymers of either with acrylonitrile, styrene, methyl acrylate, methyl methacrylate, isobutylene, and the like may have their resistance to light and air greatly increased by the incorporation of a small amount, from 0.1% to 5% or more, of my new compounds in the rubber composition. The materials of my invention may also be used as age resisters for oils which are easily oxidized, such as fish oils, linseed oil, tung oil, gasolines containing unsaturates, and the like.

The compounds of my invention have the structure

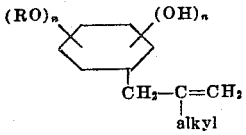

in which R is an alkyl or aralkyl group, and $n$ is an integer less than three. This group of compounds comprises the partial ethers of polyhydroxybenzenes in which a

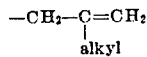

group is substituted in the benzene nucleus. Among these compounds are isobutenyl hydroquinone mono methyl ether, isobutenyl hydroquinone mono ethyl ether, isobutenyl hydroquinone mono isopropyl ether, isobutenyl hydroquinone mono dodecyl ether, isobutenyl hydroquinone mono methallyl ether, isobutenyl hydroquinone mono benzyl ether, beta-ethylallyl hydroquinone mono benzyl ether, beta-propylallyl hydroquinone mono benzyl ether, isobutenyl resorcinol mono methyl ether, isobutenyl resorcinol monoethyl ether, isobutenyl resorcinol mono benzyl ether, beta-ethylallyl resorcinol mono benzyl ether, beta-propylallyl resorcinol mono benzyl ether, and the like.

As a specific example of my invention I shall describe the preparation of isobutenyl hydroquinone mono benzyl ether. Two molecular proportions of hydroquinone and one molecular proportion of beta-methallyl chloride are added to a 10% alcoholic solution of 1.5 molecular proportion of potassium hydroxide and heated at the reflux temperature for about two hours. After the mixture is cooled to room temperature any diether which has been formed separates out of the mixture and may be removed by filtration. The mono ether may be precipitated from the filtrate by acidification, and isolated by filtration.

This mono ether, having the structure

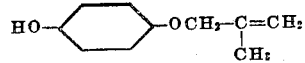

may readily be rearranged to o-isobutenyl hydroquinone by heating it with about one-half its weight of diethylaniline as solvent for about ten minutes at 225° to 250° C. Other solvents, such as dimethylaniline or various hydrocarbons may also be employed. The product, which boils at 130° to 140° C. at 3 mm. pressure, and which melts at 82° to 84° C., may readily be separated from the reaction mixture by fractional distillation at reduced pressure.

The monobenzyl ether of the o-isobutenyl hydroquinone may easily be prepared by dissolving 75 parts by weight of isobutenyl hydroquinone and 27 parts by weight of a 46% aqueous solution of sodium hydroxide in 200 parts of methanol, heating the mixture to the reflux temperature, and adding 35 parts of benzyl chloride to the solution over a period of one-half hour. The reaction mixture is heated for an additional one and one-half hours to ensure completion of the reaction. After cooling, the solution is acidified with about 20 parts of glacial acetic acid, and the precipitated sodium chloride is removed by filtration. The filtrate is then poured into about 500 parts of water, the oil which separates being removed and extracted with a 5% aqueous solution of sodium hydroxide. The monobenzyl ether, which dissolves in the alkaline solution is precipitated by acidification, separated, and distilled at reduced pressure. The product, which boils at 165° to 172° C. at 3 mm. pressure, is a colorless oil.

As an indication of the effectiveness of the compounds of my invention as antioxidants, I shall describe the effect of the above-described monobenzyl ether of isobutenyl hydroquinone in a rubber composition.

The following rubber composition, in parts by weight, was prepared:

| | |
|---|---|
| Rubber | 100.0 |
| Carbon black | 50.0 |
| Zinc oxide | 5.0 |
| Sulfur | 3.0 |
| Pine tar | 3.0 |
| Stearic acid | 3.5 |
| Mercaptobenzothiazole | 1.0 |

A similar composition containing 1.0 part of the monobenzyl ether of isobutenyl hydroquinone was also prepared. Both compositions were vulcanized in a press at 279° F. When tested on a Di Mattia flexing machine the vulcanized rubber composition containing no antioxidant ruptured after only 200,000 flexures, whereas the composition containing my antioxidant was not ruptured until after 1,400,000 flexures.

Other partial ethers having a similar structure may be synthesized by a similar series of reactions starting with the appropriate polyhydroxybenzene and the appropriate beta alkyl substituted allyl halide. The beta-alkyl group keeps its same position in the hydrocarbon chain after the rearrangement of the ether. The position of the hydroxy groups in the ring has little effect on the course of the reaction; however, the hydroxy group etherified in the first step of the reaction must have at least one ortho position open in order for the desired rearrangement to take place. Such compounds as hydroquinone, catechol, resorcinol, pyrogallol, phloroglucinol, hydroxy hydroquinone, and the like are useful starting materials. Among the beta-alkyl allyl halides which may be used are beta-methallyl, beta-ethylallyl, beta-propylallyl, beta-butylallyl, beta-hexylallyl, etc. chloride or bromide. The alkenyl substituted polyhydroxy benzene may be etherified by any of the usual methods; if the method described in the specific example is used, any alkyl or aralkyl halide, such as methyl chloride, ethyl chloride, isobutyl chloride, benzyl chloride, or the like, may be employed in the reaction.

This application is a continuation in part of my copending application Ser. No. 405,789 filed August 7, 1941.

Although I have herein disclosed specific embodiments of my invention, I do not intend to limit myself solely thereto, but only as indicated in the appended claim.

I claim:

The mono benzyl ether of isobutenyl hydroquinone which boils at about 165° to 172° C. at 3 mm. pressure.

CARLIN F. GIBBS.